Nov. 16, 1965  G. L. SHILLINGER, JR  3,217,660
TENSIONED MODIFIED HOUSEFALL AND METHOD OF OPERATING
Filed Dec. 16, 1963  5 Sheets-Sheet 1

INVENTOR.
GEORGE L. SHILLINGER, JR.
BY
ATTORNEYS

Nov. 16, 1965    G. L. SHILLINGER, JR    3,217,660
TENSIONED MODIFIED HOUSEFALL AND METHOD OF OPERATING
Filed Dec. 16, 1963    5 Sheets-Sheet 2

INVENTOR.
GEORGE L. SHILLINGER, JR.
BY
ATTORNEYS

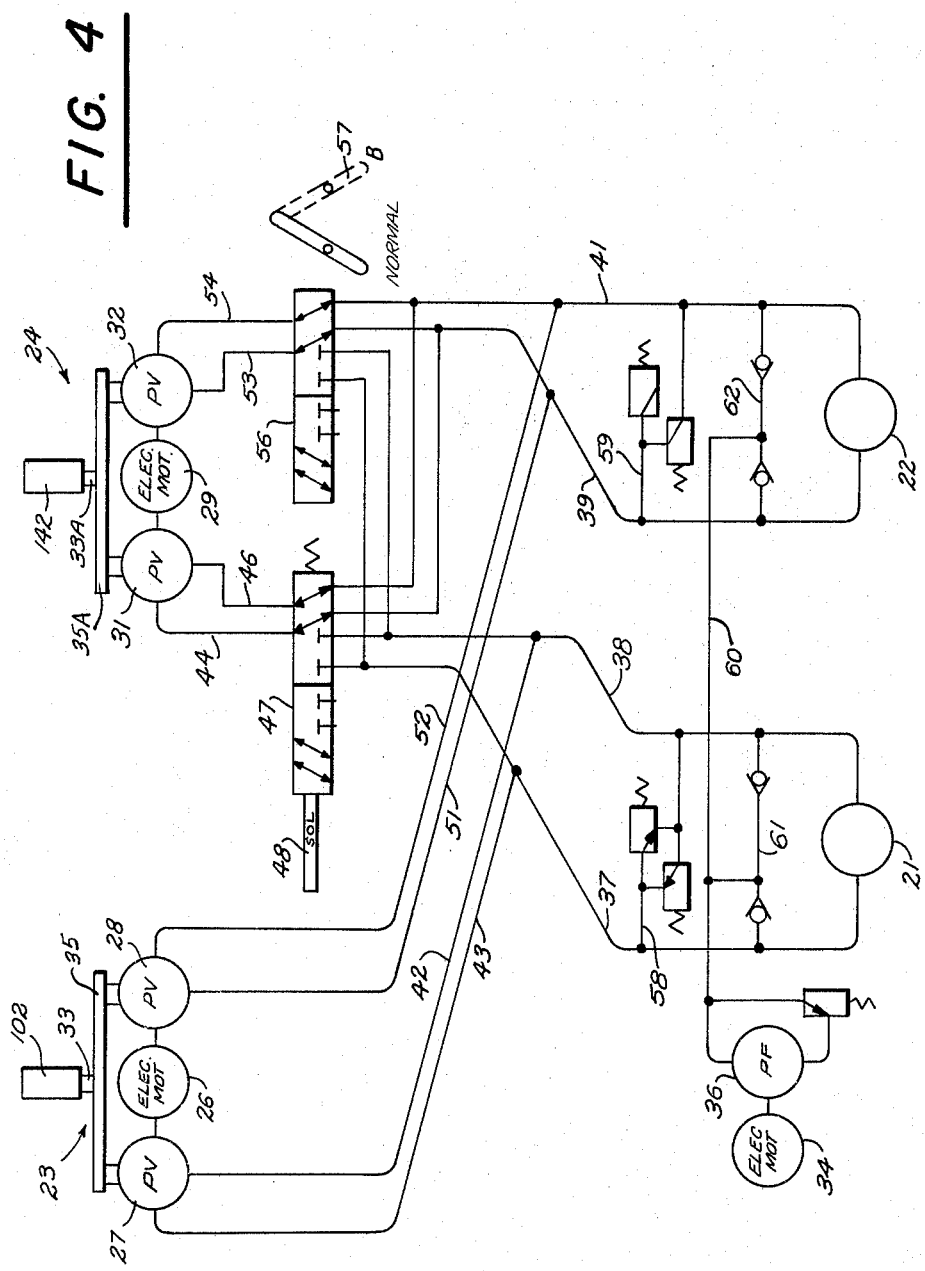

INVENTOR.
GEORGE L. SHILLINGER, JR.
BY
ATTORNEYS

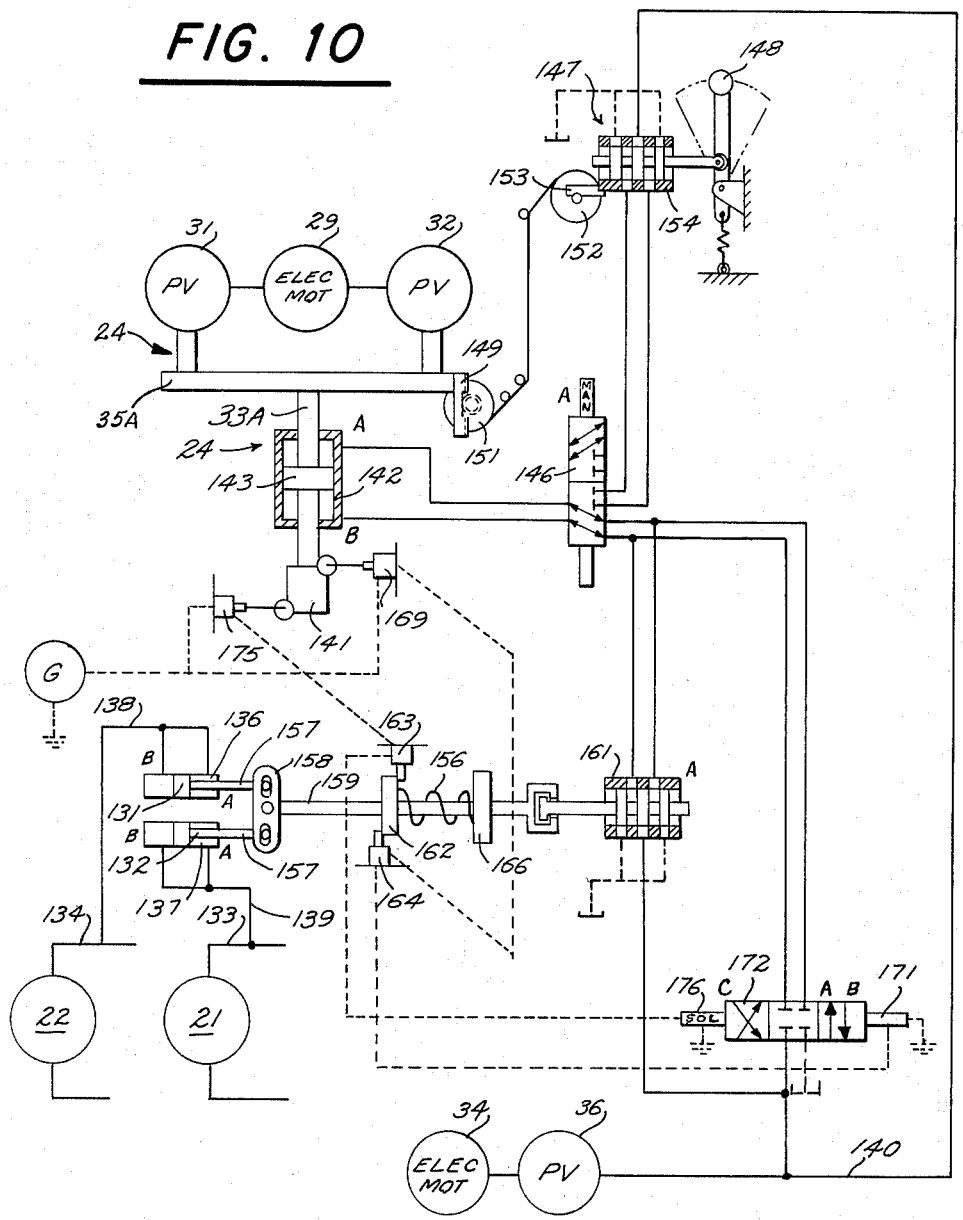

United States Patent Office 3,217,660
Patented Nov. 16, 1965

3,217,660
TENSIONED MODIFIED HOUSEFALL AND
METHOD OF OPERATING
George L. Shillinger, Jr., 1514 Oxford, Apt. 201,
Berkeley, Calif.
Filed Dec. 16, 1963, Ser. No. 331,073
8 Claims. (Cl. 104—114)
(Granted under Title 35, U.S. Code (1952), sec. 266)

The invention described herein may be manufactured and used by or for the Government of the United States of America for governmental purposes without the payment of any royalties thereon or therefor.

The present invention relates generally to conveying apparatus and, in particular, to systems and apparatus for transferring objects and materials between ships at sea.

Transfers of materials and objects between ships at sea present a number of difficulties due in large part to the random motion produced by the roll or other erratic movements of the ships, these movements resulting in an almost constant variation in the ship's spacing. As is generally known, the transfers usually are accomplished by means of a transfer line extending with a predetermined tautness between the ships, the objects to be transported being carried by a trolley that rides the line. Transfer motion of the trolley may be accomplished by out-haul and in-haul winches on which the line is wound; while special means also are employed to maintain the desired tension, or in other words, to compensate for random tension variations produced by the ship's erratic movements.

As to systems presently in use, one of the more recent developments is known as the "Tensioned High Line" in which three driven winches (out-haul, in-haul and tensioning) are mounted on the delivery ship. Further, the system may employ a ram tensioner for the purpose of compensating for the tension variation. When used, the ram engages the high line which, as can be surmised, supplies the necessary tension for the system, the ram being reciprocated vertically to take up slack or to pay out line according to operating demands.

Other types of transfer apparatus include what is known as burtoning in which the trolley, if such is used, is supported on a single line and driven winches are mounted both on the receiving and the delivering ship.

One disadvantage of prior systems resides in the location and number of winches that must be employed. For instance, the high-line system is a relatively expensive and heavy arrangement due to its requirements for three winches and winch drives, as well as the cumbersome ram tensioner. Although such a system may be suitable for large ammunition or supply ships, it is apparent that smaller vessels would have space problems. Although the burtoning arrangement utilizes only two winches, one of these must be placed aboard the receiving ship which frequently is a combat vessel on which space and weight are prime considerations. Other problems that arise with these and related modified systems concern themselves with complications in the initial rigging procedures, as well as in the break-away of the rigging upon the completion of a transfer or in the event of a sudden emergency.

A major problem, beyond the scope of economic or space considerations, is the ability of the transfer systems to accurately compensate for the random tension variation. This problem is concerned not only with accuracy as related to the fine control of the line tension, but with an equally important task of controlling the trolley's position relative to either the delivery or the receiving ship. For example, it will be appreciated that a substantial slackening of line tension, caused by a sudden rolling movement of one of the ships, may produce a greatly-exaggerated catenary in the transfer line and, of course, the catenary must be taken-up by the tension-compensating mechanism. In some of the systems, the "take-up" of this excess catenary actually pulls the trolley toward one or the other of the ships. Obviously, if the trolley is close enough to a ship, and, if the transfer load is a missile or other explosive mechanism, the take-up action can forcefully pull the load into the ship. As will become more apparent, the same hazard exists when compensating for excess wire tension.

Other considerations applicable to any shipboard equipment of this type are the need to minimize power requirements while still permitting maximum transfer speeds. Also, automatic control of both transfer and tension is desirable.

One of the important objects of the invention is to provide an "at-sea" transfer system capable of maintaining a fine control of the trolley's position relative to either the delivering ship or the receiving ship; this feature, which will be explained later in detail, being identified by the term "phasing" to generally imply an ability to selectively phase the tension control either to the delivering ship or to the receiving ship.

Another object is to provide a special rigging for the transfer apparatus, this rigging not only being simplified to the extent of utilizing a minimum number of winches located on only one of the ships, but also being specially adapted to cooperatively supplement the phasing utilized for tension compensation.

A further object, not necessarily related to the previous object, is the provision of a simplified, more economic transfer system capable of safely supporting heavy and dangerous objects and also capable of transferring the objects at a relatively rapid rate of advance while maintaining close control of the line tension.

Yet a further object is the ability to accomplish the foregoing objects in an automatic fashion.

Other objects and their attendant advantages will become more apparent in the ensuing description.

The objects of the invention, in part, are achieved by utilizing a special rigging which, in a general manner, bears similarity to what is known in the art as a housefall rigging. In this housefall rigging, a pair of winches are supported and driven at one of the stations or ships, normally the delivering ship. The transfer line extends from one of the winches to the receiving ship where it is looped downwardly around a housefall block or sheave and then returned into a secure engagement with the object-supporting trolley. The transfer line loop then is completed by returning the line from a secured position on the trolley to the other winch aboard the delivering ship. However, in the housefall system, the trolley is supported solely by its secure engagement with the return extent of the transfer line loop, while, in the present, the trolley rides the upper extent of the loop so as to be in effect supported by both outgoing and incoming extents of the wire.

A further feature of the invention is the fact that the two winches aboard the delivering ship are utilized both for control of the wire tension and for control of the transfer position of the trolley. More specifically, the two winch drums each are coupled to a pair of drives, one of which is known as the transfer drive, and the other as a tensioning drive. Preferably, the drives are hydraulic, although pneumatic or electrical drives could be employed.

In operation, the transfer drive may function to pay out wire from the transfer winch and to take it in on the other winch, it being obvious in this instance that the winches must be driven in equal and opposite directions. The tensioning drive takes over when an undesired slackening or undue tautness of the wire is produced by random ship motion. In this instance, however, the tensioning drive is so arranged as to be operable in one or two different manners or modes, the selection of the desired mode being dependent upon the position of the trolley relative to the ships. To this extent, it can be said that the tensioning control is "phased" to one or the other of the ships. Considering this phasing from a functional point of view, if the trolley is nearer the delivering ship, the tensioning drive is so controlled as to drive only the transfer winch so that the increments of wire that are added to (or subtracted from) the line are added or subtracted only to that particular portion of the line which proceeds from the transfer winch around the receiving ship sheaves and back to the trolley. The remaining portion of the line (extending from the trolley back to the other delivering ship winch) is unaffected by the increments and remains constant. The result is that any corrections in the wire catenary cause the trolley to swing with this remainder of the line as a radius. This radius, as just stated, remains constant thereby maintaining the distance of the trolley from the delivering ship as a constant. Since the distance of trolley to the delivering ship is unaffected and constant, the tensioning drive then is "phased" to the delivering ship.

After the trolley has advanced a predetermined distance toward the receiving ship, tensioning control is alternated so as to produce a condition in which the control is phased to the receiving ship. In this instance, the tensioning drive is applied to rotate both of the winches in equal and like directions so that increments of wire are added to or subtracted from both extents of the loop simultaneously. The result is that only those extents of wire between the delivering ship and the trolley are affected. The other extents between the receiving ship and the trolley are unaffected so that the distance of the trolley from the receiving ship remains constant during tension corrections. For this reason, the tensioning control then is said to be phased to the receiving ship. This concept will become clearer in subsequent description.

The invention is illustrated in the accompanying drawings of which:

FIG. 4 is a generalized schematic view of suitable combined transfer and tensioning drives, along with the hydraulic circuitry for transmitting the fluid power to the driving winches;

FIG. 10 is another schematic view illustrating the tensioning control systems of the invention.

Figure 1:
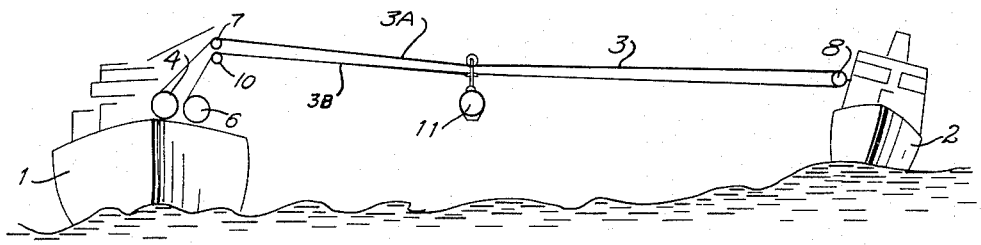
FIG. 1 is a pictorial representation of a transfer-at-sea operation utilizing the rigging and control principles of the present invention.

Referring to the drawings, FIG. 1 is included principally to illustrate the general arrangement of the transfer mechanism as well as the problems involved in transfers of objects from ship to ship while under way. FIG. 1 shows a delivering ship 1 which may be a large ammunition supply vessel and a receiving ship 2 which usually would be of the smaller combatant type. The transfer mechanism proper includes a heavy wire 3 the size and strength of which depends largely upon its intended use, and, as may be noticed, the wire extends generally in a loop from the delivering ship to and from the receiving ship. To form the loop the wire is wound at each free end on a pair of winches 4 and 6; winch 4, for descriptive purposes being designated a transfer whip winch, while winch 6 is known as an inboard ship winch. The wire or line 3 proceeds from winch 4 over a fair lead sheave 7 and then to the receiving ship which mounts a housefall block having a sheave 8 around which the wire is looped downwardly to return to winch 6 over another fair lead sheave 10.

A trolley 11 rides wire 3 which now may be considered having a transfer whip portion 3A extending from fair lead sheave 7 around the housefall block and back into a secured engagement with the trolley, as well as an inboard whip portion 3B extending from a secure engagement with the trolley to fair lead sheave 10. Trolley 11 therefore is supported by both the upper and lower portions of the wire loop.

Figure 2:
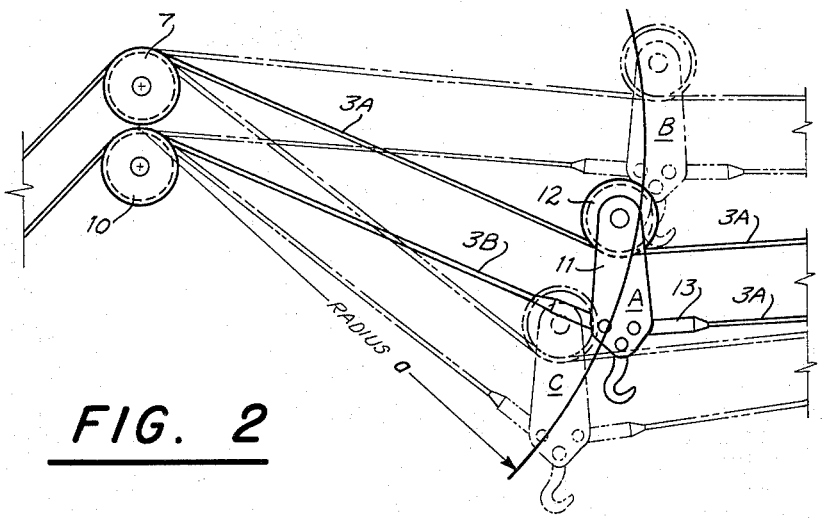
FIG. 2 is a somewhat schematic illustration of various positions assumed by the trolley in response to random tension changes, the rigging again being that of the present invention and the tensioning control being phased to the delivering ship.
Figure 3:
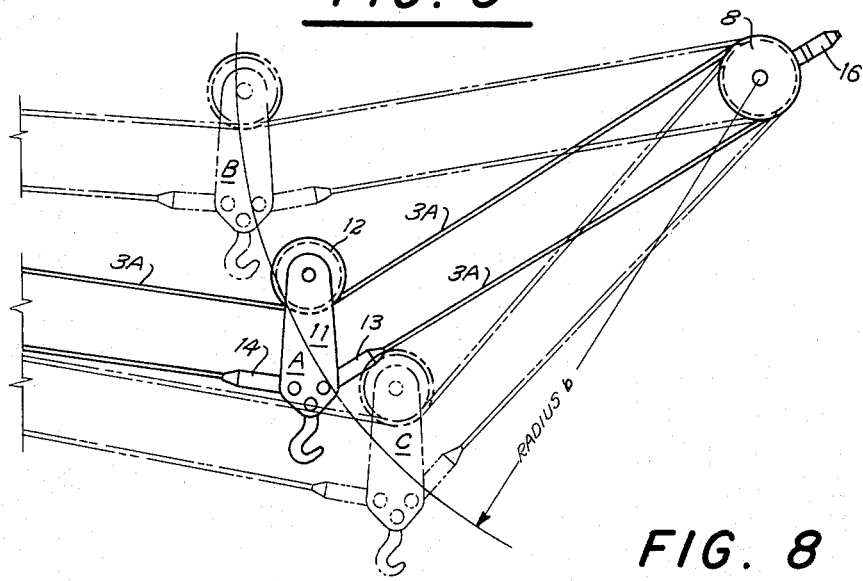
FIG. 3 is a view similar to FIG. 2 but illustrating tension control phased to the receiving ship.
Figure 6:
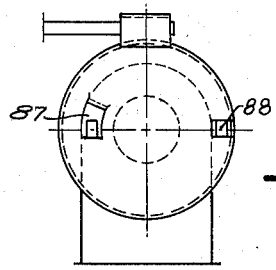
FIGS. 6 and 7 are views along lines VI—VI and VII—VII, respectively, of FIG. 5.
Figure 8:
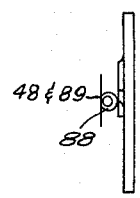
FIG. 8 is a side elevation of the gear of FIG. 6.

As readily will be appreciated, a major difficulty in any transfer arises from the fact that the separation of the ships is a constantly changing factor due to the rolling motion of the sea as well as other conditions. Consequently, there will be random tension variations in line 3 which, of course, must be compensated to prevent wire breakage or to prevent the transfer line from dropping its load into the water between the ships. FIGS. 2 and 3 illustrate different positions which the line may assume in response to tension variations, it being noted, for example, in FIG. 2 that the solid lines indicate the normal riding position of the trolley while the dotted lines represent positions assumed under random tension variations.

FIGS. 2 and 3 also illustrate in greater detail the structure of the rigging. Thus, it will be noted that trolley 11 rotatably mounts a roller 12 that rides the upper extent of wire 3. Further, to secure the trolley between the ends of transfer whip portion 3A and inboard whip portion 3B, rotatable anti-friction bearing swivels 13 and 14 are employed. The purpose of these swivels is to counteract the tendency of the wire to twist. Similarly, as shown in FIG. 3, sheave 8 of the receiving ship housefall block is coupled by a similar rotatable anti-friction bearing swivel 16 to relieve the twisting tendency.

Before further considering the different trolley positions of FIGS. 2 and 3, it would be well to generally describe the manner in which the transfer and tensioning drives combine to produce the desired trolley control. Referring to FIG. 4, inboard winch 6 is driven by a fixed hydraulic motor 21 and transfer winch 4 by a similar motor 22. Also, as already emphasized, the present invention utilizes separate and independent transfer and tensioning drives, the transfer drive being designated in FIG. 4 by the numeral 23 and the tensioning drive by numeral 24. However, both drives incorporate somewhat similar components, including an electrical motor 26 driving transfer pumps 27 and 28 and a motor 29 driving tensioning pumps 31 and 32. The transfer pumps are stroked by an actuator rod 33 and plate 35, which the tensioning pumps are similarly controlled by actuator rod 33A and plate 35A. The pumps depicted in the FIG. 4 schematic are intended to be variable axial piston pumps and the pump actuation by means of actuator rods is conventional. In other words, reciprocation of rods 33 and 33A strokes the pumps to control speed and directions of the fluid generators.

The system further employs a servo pump 36 of a fixed-type driven by an electric motor 34, this servo system also supplying replenishing pressure. Operation of these drives will be considered later.

In the preferred arrangement hydraulic motors 21 and 22 which directly drive the winch drums may be of a fixed rotary vane type. Pumps 27, 28, 31 and 32 are variable displacement reversible flow axial piston pumps. One notable distinction, however, between the transfer and the tensioning drives resides in the fact that, preferably, electrical motor 29 of the tensioning drive has substantially more output power than transfer motor 26. For example, motor 29 may be a double ended motor of any required H.P., while motor 26, although similar in other respects, need only have one-third the H.P. of motor 29. Electric motor 34 also may be a double-ended motor to supply both servo and replenishing power.

It is particularly to be noted in FIG. 4 that the transfer control drive, as well as the tensioning control drive both are hydraulically coupled to both of the motors 21 and 22. More specifically, fixed motor 21 has a pair of hydraulic lines 37 and 38 supplying its hydraulic fluid, while motor 22 has a similar pair of lines 39 and 41. Lines 37 and 38 of motor 21, in turn, are coupled to variable pump 27 of the transfer control by means of hydraulic lines 42 and 43, and lines 37 and 38 also are coupled to variable pump 31 of the tensioning control drive by means of hydraulic lines 44 and 46.

Interposed between lines 37 and 38 and lines 44 and 46 is a solenoid, spring actuated, three-way valve 47 by means of which the connection of lines 44 and 46 can be made. It might be noted at this point that the hydraulic symbolism used in the drawings mostly conforms with standard symbols for industrial equipment approved by the Joint Industry Conference, these symbols generally being known in the trade as JIC symbols. Continuing the consideration of three way valve 47, it will be noted that it employs a solenoid 48 which, when energized, shifts the valve to communicate lines 44 and 46 with lines 37 and 38. The valve is spring-returned to the illustrated position. The purpose of valve 47 will be described in greater detail later.

Motor 22 has its lines 39 and 41 coupled to variable pump 28 of the transfer control drive by means of lines 51 and 52, the motor also being coupled to variable pump 32 by means of hydraulic lines 53 and 54. A manually-operated friction valve 56 is interposed between pump 32 and lines 39 and 41, this valve being manually controllable by means of a lever 57. In a manner that can be appreciated by inspection of the drawing, lever 57 can be shifted to position B to couple pump lines 53 and 54 to lines 37 and 38 of inboard whip motor 21. The purpose in this coupling is to permit all of the hydraulic fluid generated by the tensioning control motor to be supplied to the inboard whip motor, although the necessity for such coupling arises principally during the initial rigging operation and, rather than being functional, valve 56 remains in its "normal" position during the actual transfer operations.

Other conventional features illustrated in FIG. 4 include pressure relief lines 58 and 59 connected, respectively across lines 37 and 38 as well as lines 39 and 41. Also, a replenishing line 60 from fixed pump 36 is coupled into the system in a conventional manner.

At this point, a functional consideration of the apparatus thus far described should help to clarify the purpose of the invention. First, it will be appreciated that the function of the transfer drives is to cause the trolley to move from the delivery ship to the receiving ship and, of course, back again. Consequently, tensioning drive 24 must operate in such a manner that motors 21 and 22 are driven in equal but opposite directions. In this instance, if the trolley is at the delivery station, inboard whip motor 21, which is driving winch 6, may drive the winch in a clockwise direction to permit the wire to be paid-out. Simultaneously, motor 22, coupled to transfer whip winch 4, rotates in a counterclockwise direction to pay-in the transfer whip and thereby move the trolley across the distance separating the ships. The transfer control drive will be subsequently described in detail. For present purposes, it should be apparent that its pumps can be stroked in such a manner by rod 33 and its plate 35 so as to cause the pumps to generate hydraulic fluid in one direction or the other as well as at varying speeds.

Tensioning control drive 24 is more complicated in that it can be phased either to the delivering ship or to the receiving ship. Phasing, in the sense presently used, is intended to imply the fact that, when a trolley is near the delivering ship, any tension compensation is achieved in such a manner that the distance of the trolley along the transfer line to a point on the receiving ship remains a constant so that the trolley-to-delivering-ship distance along this line does not vary. Similarly, when the apparatus is phased to the receiving ship, the distance of the trolley to the receiving ship remains constant. This fine control of trolley position during tension corrections is important since it is exercised during the dangerous intervals of proximity of the load to either ship.

FIG. 2 is an exaggerated representation of the effect of tension variation and correction when the tensioning control is phased to the delivering ship. Referring to this figure, trolley location A is the location of the trolley when tension is at the desired value. Trolley location B is a trolley location with tension increased beyond the desired value and trolley location C is a location with tension diminished below the desired value. To correct to the desired value of tension an increment $\Delta X$ must be added or taken from each part of the rig. With tensioning control phased to the delivering ship, a length of wire equal to $2\Delta X$ is added to or taken from the transfer whip 3a, while no change is made in inboard whip 3b. Thus, the radius or distance, a (delivering ship to trolley) is not affected by the tension correction as the length of inboard whip 3b is unchanged. The length of wire added to or taken from the rig affects only the portion of the wire between the trolley and the receiving ship. The need for adding $2\Delta X$ to the rig arises because of the two extents of the loop between the trolley and the receiving ship. This length $2\Delta X$ is halved by housefall block 8 on the receiving ship so that, in effect, $\Delta X$ is added to each of the upper and lower halves of the loop extending between the trolley and the receiving ship.

Location B (FIG. 2) represents a condition where ship separation has increased thereby increasing tension. The trolley moves up along the arc of radius a, this arc being centered at the upper tangent of the inboard whip fair lead sheave 10. When a length $2\Delta X$ is added to the transfer whip, the desired rig tension is restored and the trolley is returned to location A without the distance a being altered. Position C represents the condition when ship's separation has decreased and the correction for this decrease again causes the trolley to move along the arc of radius a. Again, corrections are made by operating the transfer whip winch although, in this instance, a length $2\Delta X$ is taken from the transfer whip to restore the desired rig tension.

As is apparent in the foregoing description the tension compensation when phased to the delivering ship is made entirely by driving the transfer whip to incrementally vary only transfer whip portion 3A. Referring to FIG. 4 it first is notable that tensioning control drive 24 is phased to the delivering ship since the hydraulic fluid output of both pumps of the tensioning drive communicates only with the transfer whip motor. The inboard whip remains relatively stationary.

Upon the energization of solenoid 48 of valve 47 the tensioning control becomes phased to the receiving ship and, as may be noted in FIG.4, the pumps of the tensioning drive are coupled respectively to inboard whip motor 21 and transfer whip motor 22. Tensioning control, when the apparatus is so phased, then is accomplished by driving both the inboard whip motor and the transfer whip motor in equal and like directions so as to permit all tension correction to be made in the extent of the transfer line between the trolley and the delivering ship. The lengths of the transfer line between the trolley and the receiving ship remain unaffected and constant.

By way of example, FIG. 3 is an exaggerated representation of the effect of tension variation on trolley location when phased to the receiving ship. Again, to correct to the desired value of tension an increment $\Delta X$, must be added to or taken from each part of the rig. Location B represents the condition where ship's separation has increased thereby increasing tension. The trolley moves up along the arc of radius $b$ centered at the housefall sheave 8 aboard the receiving ship. To correct the tension, two lengths $\Delta X$ are added by driving both the transfer whip and the inboard whip motors in equal and like rotational directions a sufficient amount to permit each of these motors to add $\Delta X$ to the transfer whip and to the inboard whip. The portions of the transfer and inboard whips extending from the delivering ship to the trolley vary by $\Delta X$ but they remain equal. Also, the transfer whip between the delivering ship and the trolley is maintained parallel to the inboard whip by the trolley structure. In this instance roller 12 of the trolley, as well as the rotatable housefall sheave 8 do not rotate about their own axes.

The transfer whip bight extending from the trolley to housefall block 8 and back to the trolley is not altered. Thus, the distance $b$ is not effected by the tension correction. In short, the lengths of wire added to or taken from the rig affect the portion of the rig only between trolley and the delivering ship.

To correct for the decreased tension represented by location C of the trolley (FIG. 3), both the transfer whip and the inboard whip motors again are driven equal amounts in like directions, although in this instance, they both will be driven in counterclockwise rotational direction so as to take up the undesired slack. Again, the lengths of wire taken from the rig affect only a portion of the rig between the trolley and the delivering ship so that distance $b$ remains the same and the trolley swings along the arc of a radius $b$. Consequently, the tension corrections do not tend to pull the trolley into the receiving ship or the delivering ship when the phasing is with respect to that particular ship.

Figure 5:
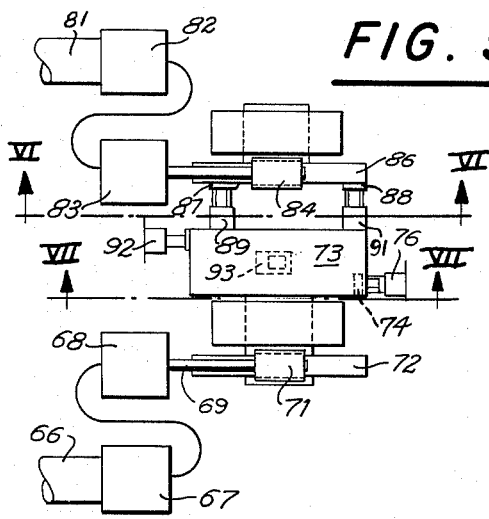
FIG. 5 is an illustration of a special cam and microswitch arrangement capable of controlling the transfer drive and of phasing the tensioning drive.

It has been noted that the selection of the phasing between the delivering ship and the receiving ship is dependent upon solenoid-operated valve 47 (FIG. 4) and that the operation of this valve, in turn, is dependent upon the energization of solenoid 48. Although the phase shift can be achieved in any number of manners, it presently is contemplated to produce the shift when a certain length of wire has been paid off of inboard whip winch 6. It will be apparent that this phasing can be accomplished by energizing solenoid 48 after a predetermined number of revolutions of the inboard whip drum shaft, the number of revolutions being measured by considering zero revolutions to represent the condition in which the trolley is stowed aboard the delivering ship. FIG. 5 represents a suitable arrangement for energizing solenoid 48 although, as will become apparent, this figure also includes a number of other elements functional only in conjunction with the transfer drive. The energization of solenoid switch 48 is pertinent only to the tensioning drive and not to the transfer drive.

Referring to FIG. 5, numeral 66 represents the drum shaft of inboard winch or reel 6, and as may be noted, shaft 66 mounts a synchronous generator 67 electrically coupled to a synchronous motor 68 which in turn drives a shaft 69 on which is mounted a worm 71. Worm 71 meshes with a gear 72 to rotatably drive a cam disc 73 on which, as far as the present considerations are concerned, is mounted a cam roller 74, this roller being adapted to engage a micro-switch 76 during a certain portion of the total revolution of disc 73. The synchronous generator and motor, as well as the worm and gear drive for the disc, are designed to permit an appropriate speed reduction and, in practice, a suitable reduction has been found to be one which relates one cam revolution with about 500 feet of wire to or from the winch drum in question. Preferably, the arrangement is such that the cam closes the circuit through the micro-switch when the trolley is about 30 feet from the delivering ship, the micro-switch circuit remaining closed during the balance of the transfer until the trolley returns to this 30 foot distance. In this manner, the arrangement is one in which the tensioning drive is phased to the delivering ship when the trolley is within 30 feet of the delivering ship, while it is phased to the receiving ship the balance of the transfer operation.

Figure 7:
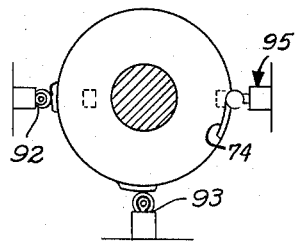
Figure 9:
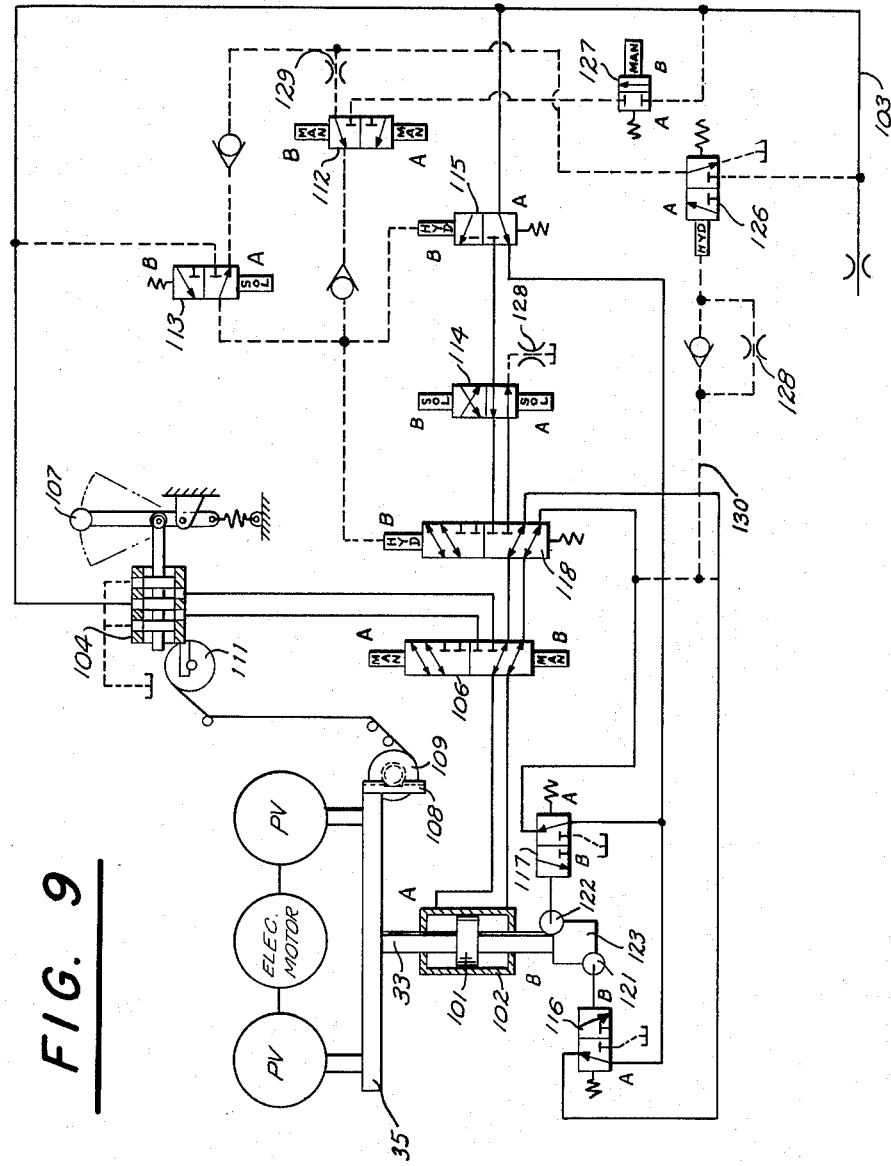
FIG. 9 is a detailed schematic view of the hydraulic circuitry of the present transfer control system.

FIG. 5 also illustrates four other cam-micro-switch combinations which, as indicated, are used for controlling the transfer drive illustrated in FIG. 9. More specifically, it will be noted that the illustrated mechanism shows a shaft 81, which is the shaft of the transfer whip winch, this shaft also mounting a synchronous generator 82 electrically coupled to a synchronous motor 83 driving a shaft on which is mounted a worm 84 that drives a gear 86. Gear 86 carries cam plates 87 and 88, adapted to engage and energize micro-switches 89 and 91 mounted on disc 73. Consequently, the energization of these particular cam-micro-switch combinations are dependent upon the rotational dispositions of both the transfer whip winch and the inboard whip winch. FIGS. 5 and 7 also show two other cam-micro-switch combinations 92 and 93, it being notable that these two, along with cam 74 are mounted directly on disc 73 since they are dependent primarily upon the rotational disposition of the inboard whip winch 6.

FIG. 9 schematically illustrates the transfer drive of the trolley. As already indicated, the drive is under the direct control of control actuator rod 33 which, as shown in FIG. 9, mounts a spool 101 reciprocable within a cylinder 102. As will be explained, the illustrated central position of spool 101 represents a stationary non-driving position. The transfer drive, in essence, is a hydraulic arrangement directed toward the positioning of the pump-stroking spool 101 for the purpose of producing trolley transfer movement in which the trolley moves rapidly from the delivering ship toward the receiving ship and then at a preset distance from the reciving ship decelerates and subsequently stops at least a sufficient length of time for unloading. Following this, spool 101 is driven in the opposite direction from a central position to reverse the drive of the motors and to cause the trolley to move at a rapid rate from the receiving ship to the delivering ship where it is initially decelerated and stopped. The drive may be accomplished manually or automatically, and the automatic operation itself may be non-cyclic or cyclic by which is meant that the delay at either the receiving or delivering ship can be manually controlled in length or can be preset for a limited desired period of time.

Considering first the manual operation, it will be noted that FIG. 9 shows a pressure line 103 and a pair of servo valves 104 and 106. With pressure at source, valve 106 is manually shifted to its position A which allows flow from source through servo valve 104 to cylinder 102. The control actuator rod 33 then is positioned by the control operator through manipulation of a manual control lever 107 which, as seen, positions the spool of valve 104. With the movement of control actuator rod 33, a rack 108 carried by plate 35 drives a gear of a synchronous generator 109, this generator being electrically connected to a synchronous motor 111 which matches the revolutions of the synchro generator rotor and which drives the sleeve of servo valve 104 in response to the actual position of the control actuator rod 33.

To achieve an automatic operation, valve 106 is shifted from position A to position B thereby isolating the manual mode of operation. Also, another valve 112 is manually shifted to its position A in which position an automatic, non-cycle mode of operation is initiated. Starting the non-cycle, automatic operation with the trolley at the delivering ship, it may be noted in FIG. 7, that cam-micro-switch combination 92 is contacted. This contact energizes the solenoid of a valve 113 to shift valve 113 to its position A. Also, cam-micro-switch combination 93 is contacted when the trolley is in this position, thus energizing a solenoid of a valve 114 to cause this valve to position itself in its illustrated position A. Under these conditions, hydraulically controlled valve 115 is pilot-drained and therefore spring-shifted into position A. Shifting of valve 115 into position A permits flow through valves 116 and 117 which both are spring-loaded to their positions A. Fluid pressure flow, as may be noted in FIG. 9, now is permitted through both valves 116 and 117 and on through valves 118 and 106 into both sides of actuator cylinder 102. Under these conditions, actuator rod 33 is held in its "neutral" or central position by the balanced fluid flow and also by the stabilizing force of a pair of cams 121 and 122 each of which then engages a cam block 123 carried at the lower end of rod 33. The transfer system then is ready for operation, although, since rod 33 is stationary, no movement of the trolley yet has taken place.

To start the operation, the control operator manually and momentarily shifts a starter valve 127 to its position B in which pilot flow is permitted through valves 127 and through previously mentioned valves 112 which, as already stated, is manually positioned in its position A to achieve the non-cycle transfer operation. The resulting power flow then hydraulically shifts the valves 118 and 115 to their positions B. Source supply then flows through valves 115, 114, 118 and 106 into control rod cylinder 102 to drive the rod and to stroke the transfer drive for delivering. The B end of cylinder 102 is drained to tank through these valves and it is noted that return flow must pass through a variable restriction 128, this restriction being preadjustable for desired acceleration and deceleration. Control actuator rod continues extension to maximum, stroking the variable pumps to maximum speed delivery.

At a preset distance from the delivering ship, cam and micro-switch combination 74–76 make contact (FIG. 5) in the manner already described to enable the phasing shift of the tensioning drive. Since the present consideration is solely with respect to the transfer drive, this feature is not illustrated in FIG. 9.

Also at a preset distance from the receiving ship, cam and micro-switch combination 87–89 (FIG. 5) contact, energizing the solenoid of valve 114 to shift this valve into its position B. Source supply then reverses to drive the control actuator rod toward return control direction. In this instance, the A end of the control actuator cylinder is drained through the preset variable restriction 128 for deceleration control. Functionally, actuator rod 33, in moving from its B end position toward neutral (center) is stroking the transfer pumps to continue the delivering action of the trolley and its load at a relatively rapid rate. This movement continues until just prior to the instant that the trolley reaches the receiving ship—or, as related to rod 33, just prior to the instant its spool reaches neutral. At this instant, the relative rotation of the inboard and transfer winch drums is such that cam and micro-switch combination 88 (FIG. 5) make contact for energizing the solenoid of valve 113 to shift this valve to its position A. Shifting of valve 113 to A passes the hydraulic pressure of pilot valves 118 and 115 to tank thereby draining these valves and causing them to return to their spring-loaded positions A.

At the instant being described, it is notable that rod 33 is in the vicinity of the B end of cylinder 102 so that cam 121, carried by this rod, is engaging valve 116 and holding this valve in its position A. As already stated, the rod is being driven toward neutral by pressure admitted into the B end of cylinder 102 and by the draining of the cylinder A end.

When the trolley reaches its midpoint, cam 121 disengages and valve 116 shifts to its position B. This shift permits fluid pressure then to flow into the A end of cylinder 102 to balance the pressure on the B end and, as will be appreciated, the control rod then is hydraulically held in its center or neutral position. Another important aspect is that the balancing of pressure produces a pressure build-up which reacts through a line 130 to hydraulically shift valve 126 into its position A. The trolley now is shifted at the receiving ship and the hydraulic circuitry is stabilized.

After the trolley is unloaded the control operator again momentarily shifts valve 127 to its position B and pilot flow proceeds through valves 127 and 112 to shift valves 118 and 115 to their position B. Source flow then proceeds through valves 115, 114 (in B position), 118 and 106 to the B of the control actuator cylinder to extend the control actuator rod toward the A end of the cylinder, the A end of the cylinder being drained in the aforesaid manner through preset variable restriction 128. The trolley then is started and acelerated toward the delivering ship. At a preset distance from the delivering ship cam-microswitch combination 74–76 disengages to return the tensioning phase to the condition described as the one in which tensioning is phased to the delivering ship.

In a manner similar to that already described, this reverse travel again causes cam and micro-switch combination 93 (FIG. 5) to make contact for energizing valve 114 so as to reverse the flow to the control actuator cylinder. Hydraulic flow then reverses to drive rod 33 from its A end back toward neutral. The B end of cylinder 102 is drained under the control permitted by variable restriction 128.

During the return flow and just prior to the instance that the control actuator rod reaches its mid-position, cam and micro-switch combination 92 contact to energize the solenoid of valve 113 and shift this valve to its position A for draining hydraulic valves 118 and 115 to cause these valves to shift to their position A. Valve 117, at this point, is in position A as its cam 123 is engaged by the control rod.

When the control rod is at mid-position, cam 122 disengages valve 117 and this valve springs to its position B. At this point, the hydraulic pressure in the control cylinder again becomes balanced in the manner already described and the rod is hydraulically held in this neutral position. As will be noted, this entire transfer is under the direct control of the operator since it is initiated by his manual triggering of valve 127. To stop the trolley at any point, the control operator manually shifts the valve 106 to its position A when the trolley approaches the particular point or, if so desired, the control operator shifts this valve to position A at any point in its travel and then, through operation in the manual mode, moves the trolley to its desired point.

The completely automatic-cycling operation is achieved by by-passing valve 127 and this, in turn, is accomplished by shifting valve 112 to its position B, this shift also placing a variable restriction 129 between valves 126 and 112. Also, valve 106 is shifted to its position B to isolate the manual mode. The sequence of operations is the same as that previously described for the "non-cycle, automatic operation" except that pilot flow through valve 126 is delayed by variable restriction 129 before continuing through valve 112. This delay permits the loading of the cargo at the delivery ship since it delays the hydraulic actuation of valves 115 and 118, these valves, being shifted to their positions B by pilot pressure which, as has been stated, is delayed by the restriction. The delay permits unloading at the receiving ship. The travel of the trolley toward either ship repeats automatically to enable a cyclic operation with a stop interval. Obviously, the operator can regain control during the automatic cycle operation by manually manipulating the valves.

As far as the present invention is concerned, the more important features involve the tensioning drive, which, as will be recalled, is the drive in which random tension variations of the transfer line are compensated either by driving the inboard winch exclusively (phased to the delivering ship) or by driving both the inboard and the transfer whip winches in equal and like directions (phased to the receiving ship). It further has been noted that the tensioning drive operates concurrently with the transfer drive since both drives are applied to the same pair of winches. However, the tensioning drive is separate and apart from the transfer drive and neither of these drives interferes with the operation of the other.

Considered in a general manner, the tensioning drive functions in response to a sensing mechanism to either pay-out or take-in such increments of wire as may be necessary for reducing excess wire tension for taking up slack. The sensing mechanism senses the random tension variations and can be accomplished either mechanically, by providing a pressure responsive means riding the transfer wire, or hydraulically in the manner presently to be described. In the subsequent description, it will be assumed that the correction is responsive to the phasing control which, in turn, is initiated by cam-micro-switch 74–76, all in the manner which has been described.

A tensioning control system is illustrated in FIG. 10, it first being noted that the pressure sensing mechanisms are provided by hydraulically coupling a pair of pressure responsive valve pistons 131 and 132 to pay-in lines 133 and 134 of motors 21 and 22. In greater detail, pistons 131 and 132 are mounted in cylinders 136 and 137, and both ends of each cylinder are coupled to the pay-in or pressure lines of the motors by lines 138 and 139. Pressure build-ups or reductions in lines 133 and 134 occur when increased or decreased loads are placed upon the motors and, in the obvious manner, these variations in pressures will move pistons 131 and 132 to the right or the left as the case may be.

The remainder of the tensioning control system can best be understood by considering its normal operation. The hydraulic power needed for the tensioning drive is supplied by electric motor 29 which, as previously indicated, should have a higher capacity than motor 26 of the transfer drive because of the increased demands produced by the tension and the load, this motor 29 driving variable pumps 31 and 32, already identified. Control pressure, however, is supplied by the servo and replenishing supply already described, i.e., electric motor 34 and another variable pump 36. Fluid pressure generated by pump 36 is supplied to the tensioning control system through a line 140. Also, in a manner similar to that described with respect to the transfer drive, the control for motors 31 and 32 is accomplished by a control rod mechanism 24 which includes a control rod 33a mounting at one external end a plate 35a and at its other end a cam block 141. The control rod has its central portion encased in a control rod cylinder 142 and, within the cylinder, the rod mounts a spool 143.

The first step in the operation is to achieve a desired wire or transfer line tension and this can be accomplished through a "manual" tensioning control. A manually operated hydraulic valve 146 is utilized for this purpose, this valve initially being manually shifted to its position A in which it permits servo flow through a servo valve 147 into cylinder 142. The control rod and its spool 143 then may be positioned by the operator through manipulation of a manual control lever 148. Also, in a manner similar to that considered with reference to the transfer control, movement of the control rod and its plate 35A reciprocates a rack 149 carried by the plate, the rack meshing with a synchronous generator 151 that is electrically coupled to a synchronous motor 152, the rotors of the motor and generator being matched in revolution. Also, the motor drives a rack 153 which positions sleeve 154 of the servo valve in response to the actual position of the control actuator rod.

If desired, tensioning control can be accomplished manually, although automatic operation is preferred. This automatic operation, however, commences with the step of obtaining the desired tension through operation of the manual control arrangement. Once a desired tension is obtained, valve 146 is manually shifted to its position B.

Assuming a condition in which the tension of the transfer line increases beyond a desired value the pressure on pay-in lines 134 and 133 increases causing pistons 131 and 132 to move toward ends A of their cylinders, these pistons normally being held in their positions by spring compression achieved in whole or in part by a coil spring 156. Pistons 131 and 132 each are coupled to piston rods 157 which, in turn, loosely connect to a plate 158. A common rod extension 159 projects outwardly from plate 158 to terminate in an hydraulic valve 161, the termination mounting suitable spools for controlling the hydraulic flow through this particular valve. Also mounted on common rod 159 is a cam block 162, the camming surfaces of this block being disposed in close proximity to micro-switches 163 and 164 which open and close as the common rod extension reciprocates. Further, the rod mounts a second block 166 and spring 156 is compressed between this block and previously mentioned cam block 162.

Upon an increase of tension, pistons 131 and 132 move toward the A ends of their cylinders, this movement compressing spring 156 and opening micro-switch 164. Also, the spool of servo valve 161 is moved toward its A end establishing a hydraulic flow to and from control actuator cylinder 142 through valve 146. As a result, the pumps of the tensioning drive are stroked in such a manner as to cause the winch motors to pay out wire to relieve the rig tension. To relieve the tension, the hydraulic flow through control actuator cylinder 142 causes the control rod to move toward end A of the cylinder. This movement, in turn, closes another micro-switch 169 mounted in proximity to cam block 141 of the actuator rod.

When tension has been reduced to a desired value, the sensing actuators are free to move toward the B end of sensing cylinders 136 and 137. This movement closes micro-switch 164. As may be noted, the situation then presented is one in which micro-switches 164 and 169 are closed and the electrical connection, as also shown in FIG. 10, is such that the closing of both of these switches energizes a solenoid 171 of a solenoid-actuated valve 172, this valve being of a type which normally is held in its central position by spring loading. Energization of solenoid 171 shifts the valve from its spring loaded position to its B position, thereby establishing an hydraulic flow which by-passes valve 161 and which proceeds through valve 146 to and from the control actuator cylinder moving the control actuator rod toward the B end of the cylinder. When the control rod reaches its predetermined fixed position, micro-switch 169 is opened and, of course, solenoid 171 of valve 172 is deenergized to cause this valve to spring back to its center position. Desired rig tension then has been restored.

In the alternative situation in which wire tension decreases below a prescribed value, pressure on lines 133 and 134 decreases, causing pistons 131 and 132 to move to the left (FIG. 10) toward the B end of their cylinder, this movement being due to spring action. Common rod extension 159 also moves toward the left under the force of spring 156, opening micro-switch 163. Further, the spool of servo valve 161 moves toward its B end establishing hydraulic flow to and from control actuator cylinder 142 to move the control actuator rod toward the B end of its cylinder. This rod movement, strokes pumps 31 and 32 in an appropriate manner to produce the generation of hydraulic flow to pay out wire from the winches so as to regain rig tension. Also, the movement of the rod toward the B end of the actuator cylinder results in a closing of a micro-switch 175.

The paying out of the wire regains the necessary tension which again is reflected in the hydraulic pressure in lines 133 and 134 so that the sensing actuator pistons 131 and 132 are moved toward the A end of their cylinders thereby closing micro-switch 163. In a manner similar to that previously noted, the closing of micro-switches 175 and 163 is so arranged electrically as to energize a solenoid 176 of previously mentioned valve 172, the energization of this solenoid shifting the valve to its position C in which hydraulic flow by-pasess valve 161 and proceeds through valve 146 to move the control actuator spool toward the A end of its cylinder. When the control actuator rod reaches its neutral position, microswitch 175 deenergizes permitting valve 172 to return to its spring loaded, centered position and, at this point, desired rig tension has been regained.

As will be appreciated, the tensioning drive which just has been described in some detail, represents only one manner in which the purposes of the present invention can be accomplished. For example, many other arrangements, including differential gearing arrangements or pneumatic controls, can be substituted. The essential parts of the tensioning drive include a need to sense the random tension variations of the wire and the need to control tensioning drive transmissions to the fixed motors in such a manner as to pay-out or take-in wire according to the demands of the situation. The same can be said for the transfer drive since this drive obviously can be accomplished in a number of other manners. However, the mechanisms employed should utilize separate and independent tensioning and transfer drives both of which, nevertheless, are capable of transmitting driving power to both winches or, in other words, to the transfer whip winch and the inboard whip winch.

The invention further contemplates the advantages of utilizing the pair of winches for both tensioning and transfer purposes, this concept materially simplifying the necessary control as well as minimizing such economic considerations as the number of components employed, the power consumed, and the rigging requirements themselves. In addition, the ability of the apparatus to be phased both to the delivering ship and the receiving ship greatly increases the accuracy in controlling the trolley position as well as materially reduces the hazards by assuring that tenison compensation does not accidently pull the trolley and its dangerous load toward either of the ships. As will be appreciated, the rigging itself is a part of the present invention to the extent that it utilizes the looped transfer line with both tensioning and transfer control aboard the delivering ship and with the trolley being supported by both out going and return extents of the transfer wire so that, during increases and decreases of the wire catenary, the transfer whip and the inboard whip remain essentially in a parallel disposition. Further, the utilization of a rigging of this type, as well as the drives employed, materially facilitates the actual initial rigging operation, and the rigging itself easily can be cast off when the transfer operation is completed.

Obviously many modifications and variations of the present invention are possible in the light of the above teachings. It is therefore to be understood that within the scope of the appended claims the invention may be practiced otherwise than as specifically described.

What is claimed is:

1. Apparatus for transferring objects between laterally-spaced stations, comprising:
   a pair of reels supported at one station,
   a sheave supported at the other station,
   trolley means supporting said objects during transfer,
   a trolley transfer line looped around said sheave and secured at each end to a separate reel,
   said trolley transfer line being secured to said trolley for incorporating the trolley in its loop,
   a transfer drive operatively coupled to both reels for driving both of said reels in equal and opposite rotational directions for advancing said trolley between stations,
   tension sensing means, and
   a tensioning drive also operatively coupled to both reels and responsive to said tension sensing means for varying the rotational direction and speed of said reels for tension-compensation purposes.

2. The apparatus for claim 1 wherein said one station mounts a pair of sheaves for supporting said transfer line in an elevated disposition, said sheaves being closely disposed one to the other with one of the pair higher than the other, whereby said transfer line loop is formed of closely-disposed and substantially parallel outgoing and incoming extents of transfer line.

3. Apparatus for transferring objects between laterally-spaced stations, comprising:
   a pair of reels supported at one station,
   a sheave supported at the other station,
   trolley means supporting said objects during transfer,
   a trolley transfer line looped around said sheave and secured at each end to a separate reel,
   said trolley line being secured to said trolley for incorporating the trolley in its loop,
   a transfer drive operatively coupled to both reels for driving both of said reels in opposite rotational directions for advancing said trolley between stations,
   a tensioning drive also operatively coupled to both reels and adapted in one operative phase for driving one of said reels independently of the other and in another phase for driving both of said reels in like rotational directions,
   said tensioning drive including transmission means for selectively enabling one or the other of said operative phases, and
   said apparatus further including phasing means responsive to the degree of trolley advance for controlling said transmission means.

4. Apparatus for transferring objects between laterally-spaced stations, comprising:
   a pair of reels supported at one station,
   a sheave supported at the other station,
   trolley means supporting said objects during transfer,
   a trolley transfer line looped around said sheave and secured at each end to a separate reel,
   said trolley loop being formed of a transfer whip and an inboard whip,
   said transfer whip extending outwardly from one reel and then downwardly around said sheave and back into a secured engagement with the trolley, and
   said inboard whip extending from the other reel into a secured engagement with the trolley,
   said trolley being movably supported by said outwardly extending portion of the said transfer whip,
   a transfer drive operatively coupled to both reels for driving both of said reels in opposite rotational directions for advancing said trolley between stations,
   a tensioning drive also operatively coupled to both reels and adapted in one operative phase for driving one of said reels independently of the other and in another phase for driving both of said reels in like rotational directions,
   said tensioning drive including transmission means for selectively enabling one or the other of said operative phases, and
   said apparatus further including phasing means responsive to the degree of trolley advance for controlling said transmission means.

5. Apparatus for transferring objects between laterally-spaced stations, comprising:
   a pair of reels supported at one station,
   a sheave supported at the other station,
   trolley means supporting said objects during transfer,
   a trolley transfer line looped around said sheave and secured at each end to a separate reel,
   said trolley being ridably supported on one portion of the loop and being secured to another portion,
   a separate hydraulic motor driveably coupled to each reel,
   a hydraulic transfer driving means operatively coupled to both motors for driving said motors and reels in opposite rotational direction for advancing said trolley between stations, a hydraulic tensioning driving means also operatively coupled to both motors, transmission means included in the operative coupling of said tensioning driving means for rotatably driving one of said motors and its reel independently of the other, a second transmission also included in said tensioning drive for driving both of said motors and reels in like rotational directions, and phasing means responsive to the degree of trolley advance for selectively alternating the use of the first and second transmission means.

6. A method of compensating for tension variations of a transfer line extending in a loop between a delivering and a reeciving station and having ends wound one on a transfer winch and the other on an inboard winch, both of said winches being mounted at the delivery station and said loop being formed of a transfer whip portion extending continuously from the transfer winch to the receiving station and back into a secured engagement with a transfer trolley, and with an inboard whip portion extending from said inboard winch directly into a secured engagement with said trolley, said trolley also riding said transfer whip, said method comprising the tension-compensation steps of changing only the length of the transfer whip when the trolley is in the vicinity of the delivering ship whereby the inboard whip length remains constant, and when the trolley is in the vicinity of the receiving station, changing the lengths of both the transfer and inboard whips by equal increments whereby the distance of the trolley from the receiving station remains constant.

7. The apparatus of claim 4 wherein a housefall block supports said sheave and a freely-rotatable swivel connector secures said housefall block at said other station.

8. The apparatus of claim 7 wherein said transfer whip is secured to said trolley by a freely-rotatable swivel connector.

References Cited by the Examiner

UNITED STATES PATENTS

| | | | |
|---|---|---|---|
| 685,580 | 10/1901 | Delaney | 214—13 |
| 709,916 | 9/1902 | Leonard | 214—13 |
| 1,159,388 | 11/1915 | Jacobs | 104—91 |

ARTHUR L. LA POINT, *Primary Examiner.*